United States Patent [19]
McLean

[11] Patent Number: 5,484,623
[45] Date of Patent: Jan. 16, 1996

[54] DIETARY SYSTEM HIGH IN OIL INTAKE FOR THE TREATMENT OF OBESITY AND FOR THE LOWERING OF SATURATED FATS

[76] Inventor: Linsey McLean, 4267 S. State Rd., Davison, Mich. 48423

[21] Appl. No.: 179,188

[22] Filed: Jan. 10, 1994

[51] Int. Cl.⁶ .................. A23L 1/302; A23L 1/304; A23D 9/00
[52] U.S. Cl. .................. 426/601; 426/72; 426/74; 426/613; 426/648; 514/557; 514/560
[58] Field of Search .................. 426/72, 601, 605, 426/612, 613, 74, 648; 514/557, 558, 559, 560

[56] References Cited

U.S. PATENT DOCUMENTS

| | | |
|---|---|---|
| 4,009,265 | 2/1977 | Howard . |
| 4,237,118 | 12/1980 | Howard . |
| 4,393,049 | 7/1983 | Horrobin .................. 514/560 |
| 4,497,800 | 2/1985 | Larson et al. . |
| 4,499,076 | 2/1985 | Ohashi et al. . |
| 4,526,793 | 7/1985 | Ingenbleek et al. .................. 426/72 |
| 4,820,731 | 4/1989 | Mascioli et al. . |
| 5,126,162 | 6/1992 | Erasmus .................. 426/72 |
| 5,132,113 | 7/1992 | Luca . |
| 5,200,226 | 4/1993 | Rodriguez .................. 426/72 |
| 5,223,285 | 6/1993 | Demichele et al. .................. 426/72 |

OTHER PUBLICATIONS

*Anatomy & Physiology,* Second Edition, Seeley, Stephens, and Tate, 1992 Mosby–Year Book, Inc., pp. 842–843.
*Dr. Atkins' New Diet Revolution,* Atkins, 1992, M. Evans & Co. Inc., Table of Contents, Chapter 22 (pp. 208–216), and Index (pp. 324–327).

*Primary Examiner*—Helen Pratt
*Attorney, Agent, or Firm*—Harness Dickey & Pierce

[57] ABSTRACT

A dietary system for the treatment of obesity and for the lowering of saturated fats in the blood. The system includes a diet that restricts the patient to the intake of certain foods in certain amounts and combines this intake with specific supplements. The prescribed foods comprise those low in saturated fats and carbohydrates, those having moderate amounts of proteins, and oils high in monounsaturates and certain fatty acids such as olive oil and canola oil. The supplements include prescribed amounts of vitamins and minerals. By providing the patient with a diet high in essential fatty acids, the glucagon-driven pathway of the patient is stimulated and less fat is stored by the body. In addition, more body fat is catalyzed for the production of energy for use by the body.

23 Claims, No Drawings

DIETARY SYSTEM HIGH IN OIL INTAKE FOR THE TREATMENT OF OBESITY AND FOR THE LOWERING OF SATURATED FATS

BACKGROUND OF THE INVENTION

I. Field of the Invention

The present invention relates to diets for humans. More particularly, the present invention relates to a dietary system for the treatment of obesity and for the lowering of saturated fats in the blood. The system includes a diet that restricts the patient to the intake of certain foods in certain amounts and combines this intake with specific supplements. The prescribed foods comprise those that are low in saturated fats and carbohydrates, those having moderate amounts of proteins, and oils high in monounsaturates and certain fatty acids. The supplements include selected vitamins and minerals.

II. Description of the Relevant Art

The patient presenting with obesity is known to require a modified diet to effect weight reduction. This same patient also typically presents with a high concentration of saturated fat in the blood.

In some cases the specific cause of obesity is identifiable, for example, were a tumor in the hypothalamus could stimulate overeating. However, as a general matter, obesity may occur for several reasons, and one or more causes in the same individual may be present simultaneously. Evidence supports the theory that some individuals have a predisposition to obesity, while other evidence suggests that environmental factors, such as eating habits, play an important role Whatever the underlying psychological or physiological basis the common belief is that for most cases of obesity overeating or eating the "wrong" foods are the main avenues to weight gain. Accordingly, conventional approaches to resolving obesity include both behavior modification and diet modification. The former approach requires significant psychological adjustment with varying results and the latter is much more common and includes a broad array of diets with many plans producing instantaneous results but being unworkable and even counterproductive over time.

Most known dies fail, however, and, unfortunately, only a small percentage of obese people manage to maintain a reduced weight over a long period of time. Rather, the typical "dieter" follows a continuous cycle of weight loss followed by rapid regaining of the "lost" weight. The problem results from the fact that most diets only seek to modify the amount and type of intake not the way in which the body responds to the food.

This situation should not be not surprising. In addition to the "input" side of the obesity problem (attempting to control how much an what types of foods are consumed), there is the little-explored "output" side (attempting to control the way in which the "input" is utilized). Basal metabolism accounts for approximately 60% of energy expenditure in the average person. About 30% of energy expenditure is accounted for by muscular activity and the remaining 10% by the assimilation of food. It is conventionally held that energy loss through muscular activity is the only form of "output" that a person can control.

Beyond "common sense" regulation of the intake of foods, research into the problems of and solutions to obesity have shed little light on what diet could be used to modify the "output" side beyond the exercise component, that is, the metabolism of food. Current diet recommendations are based upon knowledge gained from carbohydrate metabolism experiments, and little has been done with respect to fat metabolisms.

Importantly, such diets run contrary to nature where it is known that some creatures are known to have acquired an adaptive advantage over others which allows them to live and, indeed, flourish in extreme conditions. The class Mammalia which, of course, includes our species, perhaps best characterizes adaptive advantage. The most important physical innovation of mammals is their evolution of temperature-control mechanisms that allows for the maintenance of a high and constant body temperature. This is possible because of the mammal's ability to store fat (or blubber) which provides excellent insulation and heat energy and also because of the heat-producing metabolic pathways. In non-human mammals, this advantage may be readily seen in "fat" polar bears and seals. Zoo animals normally residents of warmer climates begin to demonstrate the adaptive advantage of fat storage if left with their cool-climate fellows of the zoo into the fall. In fact, most animals demonstrate transient obesity, losing weight in the spring and summer and gaining weight in the fall. Humans have further demonstrated the presence of "survival metabolism" during times of fasting when the body responds to lowered food intake by lowering basal metabolism to conserve energy. This is another example of the ancient "ice age metabolism".

Even in plants nature complies with temperature changes by allowing the shuttling of the metabolism of plants when temperatures change. Plants normally store food from photosynthesis as starch and other complex carbohydrates toward the production of cellulose, an indigestible carbohydrate. When temperatures drop, some plants demonstrate a limited ability of oxidation whereby long chain carbohydrates are broken down into simple sugars and are burned in an attempt to maintain a higher internal temperature. It is known that plants have a higher amount of sugar in the fall than in the summer. (Practical experience discloses that fruits and vegetables left in the refrigerator are "sweeter" than those not so chilled.)

Some group of the species Homo sapiens also well characterize this adaptation. For example, there are entire populations whose ancestors originally hailed from cold climes that exhibit considerable fat-storing ability. (It is also known that lower melanin pigment production also characterizes an adaptive advantage for populations away from the equatorial region that did not need the advantage of sun screening. In these populations, more vitamin D can be absorbed with less exposure to the sun and, because vitamin D is a fat-soluble vitamin, the persons making up this "fat storing" population would naturally be able to store more vitamin D than their darker equatorial counterparts.)

Accordingly, previous diets have proven themselves to be inadequate to resolve the long-term treatment of obesity.

SUMMARY OF THE PRESENT INVENTION

The present invention provides a solution to the problems described above by offering the obese individual a dietary system for the treatment of obesity and for the lowering of saturated fats in the blood. The system includes a diet that restricts the patient to the intake of certain foods in certain amounts and combines this food intake with specific supplements known to fuel fat-metabolism pathways in the body.

Generally the diet is directed to the avoidance of foods known to stimulate weight gain and the inclusion of foods and supplements that enhance the desirable pathways while suppressing the undesirable pathways.

The prescribed foods comprise low carbohydrate, medium protein foods low in saturated fat and selected oils high in monounsaturates and certain fatty acids. A diet regimen that consists of eggs (or egg protein as well as fish or meat protein), citrus juice (optional), lean meat, vegetables, and salad (with other foods such as soup optionally available) is provided, combined with certain amounts of oils high in monounsaturates and certain fatty acids. The preferred oils include oils high in essential fatty acids, such as olive oil, canola oil, evening primrose oil, borage oil, black currant oil, or other oil high in essential fatty acids. These oils are high in linoleic acid and linolenic acid, some of the essential fatty acids, as well as monounsaturates.

The dietary system of the present invention overcomes the deficiencies of known diets by reversing the metabolic pathway of obese people so that nutrients that would otherwise be stored as fat are used.

Other objects and details of the present invention will become apparent from the following detailed description.

DETAILED DESCRIPTION OF THE PREFERRED EMBODIMENTS OF THE PRESENT INVENTION

A. Biochemical Foundation of the Dietary System

The basis for the present invention finds its foundation in recognizing that natural processes related to the "output" of ingested food can be modified. The normal pathway to the storage of fat begins with low levels of fatty acids, glucose, and amino aids which stimulate appetite. Appetite is most immediately satisfied on the intake of carbohydrates (which is craved to offset falling blood sugar levels), and the metabolism of carbohydrates (in particular polysaccharides) results in simple sugars, such as glucose, through hydrolysis and an increase in blood glucose levels. This increase leads to the release of the hormone insulin. Insulin, which normally regulates carbohydrate metabolism in the body by decreasing the blood glucose level, causes an increased uptake of glucose into the body cells. The secreted insulin drives forward the pathways in the production of triglycerides, the normally-occurring ester of a fatty acid and glycerol. Triglycerides the chief constituents of fats and oils, are ultimately stored in fat cells. Interestingly (but not surprisingly), hyperinsulemia has en correlated with obesity.

The storage of fat that results from carbohydrate metabolism is the main reason that diets low in fat and high in carbohydrates fail. For obese people prescribed low carbohydrate diets, the likelihood of failure is high, again because falling blood sugar levels increase the likelihood of cheating by stimulating the craving for carbohydrates. (High protein diets typically fail because high levels of protein depress basal metabolism.)

As mentioned, falling temperatures stimulate plants to produce simple sugars to stay "warm". Plants do this by running their storage pathways in reverse. When an animal eats this sweeter food late in the year, the ingested simple sugars trigger this cascade of reactions and more fat is stored in the animal's fat cells for the winter.

Essentially then there are two pathways involved in the intake of food. One is the insulin-driven (or "storage") pathway and the other is the glucagon-driven (or "usage") pathway. Naturally the pathways are antagonistic. In the person of normal weight for a given height and age, the two pathways essentially are balanced. Only so much is taken in as is needed, and little or none is stored, with the exception of normal storage during cold weather as part of the normal person's transient adaptation. The adaptation in the normal person is lost when warm weather returns.

However, in the obese person, the scale is tipped in the direction of a preference for an insulin-driven storage pathway. This preference, while transient in the normal person, has become a part of the obese person's genetic make-up after thousands of years of transient adaptation. The transient adaptation became a permanent adaptation somewhere in that person's most distant ancestors because of, most likely, stressful environmental factors such as continued cold or the undependability of an available food source. Thus the normal person may eat a quantity of carbohydrate-intensive food and not gain any weight because of the antagonistic nature of the normal pathways.

Yet when the obese person eats the same food in the same amount, instead of eliciting a normal, balanced response, an overwhelming response of the insulin-driven pathway results. Accordingly, simply reducing the amount of the food intake is not realistic treatment for these people. For the normal person with normal pathways, a reduction in weight would result. However, the body of the obese person is still in the "storage" mode and will treat the lower amount of food as a famine condition whereby the body enters a starvation mode and the basal metabolism is reduced whereby food stores (fat) are saved and fat is only catabolized very slowly. This is a normal response given the obese person's genetic predisposition. This is another reason why behavior modification does not work satisfactorily.

In fact, in the obese person, the insulin-driven pathway charges forward by the reaction of the endocrine system to the smell or sight of food. This is why overweight people are often diabetic or hypoglycemic. Because of the preference for insulin-driven storage, sugars are not normally available for use by the body as with a "balanced pathway" individual.

Traditional dietary treatments fail because, through neglect, they are based upon the presumption that the pathways are balanced. The dietary system of the present invention overcomes this failure by, first recognizing that the obese person has a preference for the insulin pathway and, second, tipping the scales back to pathway "balance". It is this reversal of the pathway imbalance that is the key to the present invention.

In particular, it was discovered that the steps between phosphorylation and the uptake of glucose in the cells is reversible. In obese people, due to their adaptive advantage to conserve energy and with their resulting lower basal metabolism and lower body temperatures, the normal "plant chemistry" of reversing pathways to derive energy does not function. They are genetically predisposed to store fat, not to utilize fat.

According to the present dietary system the glucagon-driven pathway is enhanced by the elevated amount of oil high in monounsaturates and certain fatty acids, and, through a high vitamin, high mineral, moderate protein, and low carbohydrate diet, lipolysis is stimulated and stored fat is utilized as an energy source. Therefore, oils high in certain essential fatty acids and monounsaturates should not be compared with other fats and oils, as will be discussed further below.

The stabilization of blood sugar levels and characteristic suppression of appetite are key features of the present diet. By utilizing specified oils as opposed to carbohydrates, major metabolic energy needs are still met while the glucagon pathway is fueled. While the central nervous system cannot utilize oils for energy (thus restricted amounts of carbohydrates are allowed under the diet), all other body tissues can catabolize oils or carbohydrates for energy production. Muscle tissue has actually been found to prefer fatty substances over carbohydrates. When muscles catabolize fatty substances for energy, there is usually much less soreness produced upon exercise. This fact is an advantage to both race horses and human athletes. (Experiments with obese people who follow the present diet and who were not accustomed to exercise were surprised to find that there was no muscle soreness at all even after exercise of 30 to 50 minutes per day.)

The oils of the dietary system of the present invention are selected from those oils high in fatty acids that include linoleic, gamma linoleic, and linolenic acid (all $C_{18}$). Oleic acid is also in this group, but its use as proposed is still being investigated. Similarly, other essential acids may be of value for the user of the present dietary system. Of this group of fatty acids, linoleic and linolenic acids are referred to as essential fatty acids because they are necessary nutrients and are not synthesized in the body. The oils of choice are olive, canola, evening primrose, borage, or black currant oil, or any other oil high in essential fatty acids. Each of the named oils is high in essential fatty acids. (Certain oils high in polyunsaturates as well as foods containing oils high in polyunsaturates are excluded under the present dietary system, as these oils and foods containing them have not been demonstrated as having any weight-losing characteristics. The most common examples of these oils are corn oil and soy oil and any hydrogenated or partially hydrogenated oil containing trans-fatty acids [such as margarine or vegetable shortening].)

At one time it was common for biochemists to casually group fats and oils together, thus giving any oil an unfortunate aura of being as potentially harmful to human health as, for example, saturated fat. A subsequent and related debate arose over the advantages and disadvantages of polyunsaturated fats over saturated fats. Whatever the outcome of that debate, it is clear that the oils specified in the dietary system of the present invention do not pose the risk associated with "fats".

Biochemically, the fatty acids stimulate adipose-cell lipase, indirectly, by phosphorylation. Through lipolysis, the enzyme breaks down triglycerides (also called neutral fats or triacylglycerols), which have three fatty acids attached to a glycerol molecule, into the glycerol and the separate fatty acids. Glycerol is in turn converted into glucose (and pyruvate) in the liver and the glucose may thereafter be used for energy by the body. (As noted above, diets high in carbohydrates do not work because insulin, the levels of which are increased by the metabolism of the carbohydrate, inhibits lipolysis.) The mechanism may actually be summarized by understanding that while both pathways are stimulated when food is eaten, the glucagon-driven usage pathway is stimulated further by fatty acids.

Of the preferred oils, olive oil is a nondrying oil that is sparingly soluble in alcohol. It comprises as its chief constituents oleic acid, palmitic acid, and linoleic acid.

Canola oil may be used as an alternative to olive oil. Canola oil is a vegetable oil derived from the seeds of the cabbage-like plant, Brassica campestris. The oil derivative is high in unsaturated fats and acids, including erucic, linolenic, and linoleic acids. The oil has a high content of apolipo proteins made up of single, hydrophobic 19-K polypeptides. Canola oil has considerable value for use in low-fat diets, such as the present program.

Evening primrose oil, another alternative to olive and canola oil, is an oil high in fatty acids. The oil is extracted from the evening primrose of the genus Primula. Other oils, such as borage oil and black currant oil, or any such oil high in essential fatty acids, may be used in the program according to the present invention.

The dietary program of the present invention also specifies doses of iodine. The thyroid regulates catabolism of fat and the activity of the thyroid is enhanced by the presence of iodine. Accordingly, iodine provides the advantage of assuring proper thyroid function by facilitating the activity of the thyroid. Iodine is involved in the biosynthesis of thyroid hormones through organification into mono- and diiodotyrosine. Inadequate levels of iodine prevent thyroid hormones from being synthesized and, as a result, hypothyroidism occurs. This malady leads to weight gain and would counteract the stimulation of the "usage pathway" of the present invention. It is noteworthy that relatively high iodine intake is found in the typical Asian diet. The sources of the iodine may be iodinated vegetable oil, iodinated caseinate, iodine trichloride, triiodothyronine (T3), thyroxine (T4), iodenated protein products, iodenated amino acids, and mono-, di-, and tri-iodinated amino acids and peptides or other suitable inorganic salts.

In essence, the present dietary system is best characterized as a "mathematical sum" of pathway-driving foods according to a given schedule. If the "sum" of insulin pathway-driving foods is greater than glucagon pathway-driving foods, the net effect will be weight gain. Conversely, if the "sum" of glucagon pathway-driving foods is greater than the insulin pathway-driving foods, the net effect will be weight loss. The driving effect of the program of the present invention on the glucagon pathway may be better understood by comparing it graphically with a typical insulin pathway-driving meal:

| RESULTS OF TYPICAL MEAL | | |
| --- | --- | --- |
| Component | Insulin | Glucagon |
| Bread | increase | no change |
| Rice or pasta | increase | no change |
| Meat or fish | increase | increase |
| Wine | increase | no change |
| Dessert (sugary) | increase | no change |
| TOTAL: | 5 × increase | 1 × increase |

| RESULTS OF MEAL FOLLOWING DIETARY SYSTEM OF THE PRESENT INVENTION | | |
| --- | --- | --- |
| Component | Insulin | Glucagon |
| Salad with specified oil | no change | increase |
| Vegetables cooked with oil, optional butter or cheese flavoring | no change | increase |
| Meat | increase | increase |
| Soup (assuming some fat native to meat) | no change | increase |
| TOTAL: | 1 × increase | 4 × increase |

B. Regimen of the Dietary System

The dietary system of the present invention comprises two basic parts that, when combined as a system, provide the user with a regimen to combat obesity. The first part comprises prescribed foods that include low saturated fat, low carbohydrate, moderate protein foods and oils high in monounsaturates and certain fatty acids. The second part comprises a variety of supplements including vitamins and minerals. A preferred schedule is also provided. The combination of the first and second parts taken according to the preferred schedule appears to have a synergistic effect. Thus individual experiences from following the dietary system have been unexpectedly successful.

1. Prescribed Foods and Schedule for Dietary System

The foods prescribed under the dietary system include oils high in monounsaturates and certain fatty acids and low fat, low carbohydrate, medium protein-rich foods. They are provided at given conventional intervals during the day, such intervals being breakfast, lunch, and dinner. A snack is allowed in the afternoon and before bed.

Enhancing the glucagon pathway by the prescribed between-meal oil regimen at crucial times during the day is desired. The object is to provide such intake just before blood sugar levels begin to drop, typically before lunch and before the afternoon slump when insulin levels are known naturally to be the highest. Such time intervals are normally about every three hours. This regimen will suppress surges in insulin pathways by fueling the antagonistic pathways of glucagon and will, simultaneously, suppress appetite.

Saturated fats are restricted to being provided in very low levels as tie goal of the present diet is to switch the body's metabolism toward fat metabolism and use the body's own stored saturated fat as a substrate. (High levels of saturated fat in the diet, if allowed would compete with the body's own enzymes necessary for metabolism. Ideally virtually no saturated fats would be ingested. Butter is allowed to entice and suitably flavor the vegetables.)

The diet calls for moderate amounts of protein as necessary to maintain muscle tissue. High protein levels in a person's diet have been shown to have a depressing effect on basal metabolism.

The diet also requires that the allowed meats not be heavily salted as high-salt intake tends to result in water retention. Similarly, bacon, ham, sausage or large quantities of cheese are specifically excluded from the diet. Obese people tend to retain water anyway, and such salt intake would only worsen the situation.

The snack should comprise only a piece of small whole fruit, or between 0.25 l and 0.5 l of an allowed vegetable or salad. The fruit allowance is made contrary to conventional low-carbohydrate diets. Fructose, the natural sugar of fruit, produces a lower insulin response than glucose or sucrose. Diets where absolutely no sweet-tasting foods were allowed were reported in case histories of dieters to have the highest failure and cheating rate, especially in those individuals who embodied "binge" behavior in the past. By allowing controlled portions of sweet-tasting fruits, the cheating tendency is minimized. In any event, the oils of the present diet according to the prescribed time intervals tip the energy-utilization balance toward the glucagon pathway even where several pieces of fruit are eaten each day. (The fiber of the fruit also helps to slow absorption and thus further balances insulin response.)

During the day a generous amount of water (preferably distilled water) should be consumed (about 1.0 l to 2.0 l), optionally with half a twist of lemon or lime. The weights and volumes indicated are presented as general recommendations, and it must be understood that some of these values may be reasonably varied ore or less according to the individual needs.

a. Breakfast

According to the dietary system of the present invention, breakfast should comprise the following:

two to three eggs or egg whites (with soft yolks) or their equivalent of an egg-based protein equivalent such as poached fish or lean meat (no bacon ham, or sausage)

between 0.2 l and 0.5 l of a citric juice between 125.0 g and 250.0 g whole, fresh fruit (optional)

between 0.2 l and 0.5 l of either coffee or tea (cream is permitted, but no sugar)

b. Lunch and Dinner

According to the dietary system of the present invention, lunch and dinner should comprise the following:

between 100.0 g and 300.0 g lean meat between 100.0 g and 900.0 g of one or more allowed vegetables salad to satisfy with a generous amount (to soak) of one of the prescribed oils and a low salt dressing between 0.25 l and 0.75 l low salt meat or vegetable soup (not a cream) (optional)

between 0.2 l and 0.5 l of either citrus juice, coffee, or tea (cream is permitted, but no sugar) the regimen for the intake of oils is set forth below under "C. Application".

c. Foods to be Excluded

The patient should exclude certain foods that are likely to counteract the effects of the dietary system of the present invention. The foods to be excluded include soy and soy products, turnips, broccoli, cauliflower, brussels sprouts, peanuts, cabbage (these foods have been shown to exhibit antithyroid activity in the body and are known to support the development of a hipothyroid system and resulting goiter); protein powder drinks and bars (these are commonly soy-based products); all high starch products including cereals, breads, pastas [all flour products], rice, peas, corn, potatoes (these products have a high glycemic index which stimulates the insulin-driven pathway); all sugars and soda; artificial sweeteners (except stevia), artificial colors and flavors (these are known to adversely affect a percentage of the population with respect to water retention and mood); quantities of milk (eighty percent of adults have a milk protein allergy); salty foods (these are a problem for obese people who tend to retain water); margarine (butter is acceptable in small quantities); polyunsaturated oil and foods containing such oils such as margarine, corn oil, soy oil, and partially hydrogenated vegetable oils (these are not believed to drive the glucagon pathway and frequently generate alleged cancer-causing free radicals).

2. Prescribed Supplements for Dietary System

The supplements prescribed under the dietary system include vitamins and minerals. Each of the vitamins and minerals prescribed in the diet has special functions in the dietary system of the present invention. Accordingly, they are prescribed in higher levels in the present invention than are generally thought to be appropriate in conventional diets.

a. Vitamins

Vitamin A, of which emulsified forms are the best and safest, is generally accepted as being an anti-oxidant. This is necessary to counter the increased number of free radicals created with increased metabolism. (Free radicals are known to cause cancer, advance aging, and cause inflammation.) In addition, Vitamin A is also required to prevent excess keratin production, this often being associated with hypothyroid activity. Additional amounts of Vitamin A also aid in preventing anemia and infections, the latter characteristic being important because low metabolism persons often have low basal temperatures, thus making them at greater risk for infections such as Candida.

Vitamin D, of which the emulsified form is again best and safest, is necessary for proper calcium metabolism. Morbidly obese individuals often experience leg cramps and arthritis, and these condition of these persons has been shown to improve with higher intake of this vitamin.

Vitamin E is another antioxidant, and therefore along this line provides the same sort of advantage to the obese person as does vitamin A. Vitamin E is also particularly useful in fat metabolism and helps in improved heme synthesis and thereby reduces the incidence of anemia. Deficiency of this vitamin has been shown to be associated with malabsorption diseases which seem to afflict the morbidly obese.

Vitamin B complex includes all of the B vitamins, all of which are water soluble and therefore cannot be stored in the body for any length of time. Most of the B complex vitamins are converted to co-enzymes which are necessary in catalyzing energy producing pathways or hematopoiesis. Because adrenal function is closely involved with thyroid function and fat burning in the body, elevated amounts of pantothenic acid (and vitamin C) have utility in keeping adrenal function in step with thyroid function. Increased stress on the thyroid as well as increased production of thyroid hormones (or even exogenous thyroid) can precipitate adrenal insufficiency (Adrenal glands have a high requirement for vitamin C and pantothenic acid.)

Vitamin C, in addition to having value in adrenal function, provides benefit to the immune system in also having powerful antioxidant properties. Vitamin C helps in the absorption of iron and therefore use useful in preventing anemia, osteoporosis and calcium metabolism. This vitamin, which is not synthesized in the human body, must be ingested. (Compared with the synthesis of vitamin C in goats—about 17 g per day—present recommended daily allowances are probably too low, even for persons of normal metabolism.) Excess amounts of vitamin C are simply excreted without incident.

b. Minerals

Calcium, mentioned extensively above, and magnesium are both important in the buffering systems of the human body. Magnesium is ubiquitous in living tissue and is either primarily or secondarily responsible in almost all chemical reactions of the body. Calcium and magnesium are also important in the dietary system of the present invention in that they maintain proper blood sugar metabolism, nerve and muscle function, endurance, stamina, strength and water balance. (Water balance is important in the morbidly obese because of the tendency of these individuals to retain water.)

Potassium is necessary for enzymes used in carbohydrate, fat and protein metabolism. In addition, potassium provides assistance in maintaining proper electrolyte and water balance. Poor absorption can result in potassium deficiency and can contribute to chronic fatigue, constipation, muscle weakness, dry skin, soft and sagging muscles, and muscle cramps. The morbidly obese are particularly susceptible to these maladies. Potassium (in addition to calcium and magnesium) is important in the proper regulation of the menstrual cycle which is often irregular in morbidly obese women.

Iron has as its major function blood and heme formation. Most importantly, only about 5 to 10 percent of iron is absorbed from the diet in the normal individual. In the morbidly obese (displaying absorption problems with related anemia, higher than the general population), iron supplements in biologically active forms in higher amounts directed to overcoming malabsorption problems result in a marked difference in the physical, mental and emotional status of the morbidly obese. Literature as well as the inventor's experimental results support this finding.

Copper has value in iron absorption and in the formation of hemoglobin structure. It is also significant in the alleviation of arthritis and in regularizing menstrual cycles, this latter problem discussed above with respect to potassium.

Zinc has value in maintaining water balance (a key in the prevention of bloating, also discussed above), blood sugar regulation, proper immune function, bone and joint health, development and maintenance of sex organs, and in the prevention of atherosclerosis. Lipemia (with complications) is common in morbidly obese people because of the poor metabolism of fats.

Manganese is a trace mineral involved in enzyme production, reproduction and fertility (particularly in females), proper thyroid function and blood sugar regulation.

Selenium is a necessary nutritional factor for all animals. It is a potent antioxidant and an anti-cancer element, and finds use in devitalizing toxic substances. These characteristics are important because morbidly obese individuals typically demonstrable low basal metabolism and are therefore unable to carry certain metabolic pathways to completion. The resulting buildup of intermediaries often produces toxic effects. The body responds to the presence of toxins by retaining water in en effort to dilute the offending compounds. Therapeutic amounts of such enzyme activating minerals produce a diuretic effect in that the previously halted pathways can now be completed, thus eliminating the need for the body to retain excess water. Such toxins may be of exogenous or endogenous origin. In addition, selenium also has use in reproduction.

Chromium is known to have value in proper blood sugar regulation and fat metabolism. It is also valuable in controlling hypertension and atherosclerosis, both maladies being commonly seen in the morbidly obese.

C. Application

Each of the vitamins, minerals, and oils are provided at approximately three hour intervals. As with the other aspect of the dietary system, the weights and volumes indicated are presented as general recommendations, and it must be understood that some of these values may be reasonably varied more or less according to the individual needs. In addition, the order of the consumption of the supplements may be other than as listed, also depending on individual needs. Additionally, the listed oils may be substituted for each other as well as being substituted by other oils high in essential fatty acids. The supplements may be provided in either tablet, capsule, liquid, or gelcap form or a drink mix powder.

I. Daily—Unscheduled between 500.0 mg–2000.0 mg calcium between 1.0 mg and 5.0 mg iodine (or between 25.0 ug and 500.0 ug L-thyroxine)

between 500.0 mg and 2000.0 mg magnesium between 50.0 mg and 300.0 mg each of vitamins $B_1$, $B_2$, $B_3$ between 50.0 mg and 1000.0 mg vitamin $B_5$ between 200.0 mg and 300.0 mg vitamin $B_6$ between 500.0 ug and 1500.0 ug vitamin $B_{12}$ between 500.0 mg and 2000.0 mg of L-tyrosine between 50.0 ug and 150.0 ug p-aminobenzoic acid between 100.0 mg and 300.0 mg potassium between 5,000.0 I.U. and 25,000.0 I.U vitamin A between 1500.0 mg and 5000.0 mg vitamin C between 400.0 I.U. and 1000.0 I.U. vitamin D between 400.0 I.U. and 1000.0 I.U. vitamin E between 200.0 ug and 700.0 ug selenium between 20.0 mg and 40.0 mg iron between 1.0 mg and 3.0 mg copper between 20.0 mg and 40.0 mg zinc between 10.0 mg and 30.0 mg manganese
between 200.0 ug and 1000.0 ug chromium
between 50.0 ug and 1000.0 ug folic acid
between 50.0 ug and 300.0 ug biotin
between 5.0 g and 30.0 g lecithin II Daily—Scheduled a. 8:00 AM
   between 4.0 ml and 6.0 ml canola oil
b. 11:00 AM
   between 4.0 ml and 6.0 ml canola oil
   between 0.5 ml and 2.0 ml evening primrose oil (or other oil high in essential fatty acids)
c. 2:00 PM
   between 4.0 ml and 6.0 ml canola oil
   between 0.5 ml and 2.0 ml evening primrose oil (or other oil high in essential fatty acids)
   snacks, such as one whole fruit (small fruit, such as apple, peach, nectarine, plum), vegetable, small piece of cheese, salad, an egg
d. 5:00 PM
   between 4.0 ml and 6.0 ml canola oil
e. 8:00 PM
   between 4.0 ml and 6.0 ml canola oil
   between 0.5 ml and 2.0 ml evening primrose oil (or other oil high in essential fatty acids)
f. 11:00 PM
   between 4.0 ml and 6.0 ml canola oil
   between 0.5 ml and 2.0 ml evening primrose oil (or other oil high in essential fatty acids)
   snack (as provided for at 2:00 PM)

The supplements listed above are grouped together and are spread out throughout the day and are taken both with meals and with oils between meals.

Following the prescribed dietary system, the typical patient loses between six and thirteen pounds in the first week, and with the second week the patient typically loses between three to six pounds. During the following week, the typical patient loses three to six pounds. The typical patient continues to lose smaller amounts as they follow the diet. However, hormonal shifts cause the patient to occasionally either temporarily regain one or two pounds or remain the same. Much of this variance depends on the presenting weight of the patient, as in particularly obese individuals the production of hormones may follow an extreme pattern. So-called "plateaus" are occasionally met, but even when the patient under the present dietary system is on a plateau, continued size loss (a drop in clothes size) is evidenced. Weight loss recommences after a period of time.

The invention will be better understood from a consideration of the following example.

EXAMPLE

A patient following the diet of the present invention was found to have experienced a drop of eight pounds after one week and four additional pounds during the second week. By the end of the third week the patient lost a total of fifteen pounds. During the fourth and fifth weeks the patient gained a pound, but beginning the sixth and seventh weeks the patient experienced an additional weight loss of three more pounds. Compliance did not prove to be a problem.

The invention being thus described it will be obvious that the same may be varied in many ways. Such variations are not to be regarded as a departure from the spirit and scope of the invention, and all such modifications are intended to be included within the scope of the following claims.

What is claimed is:

1. A dietary system for the stimulation of lipolysis that shifts the dieter's food utilization pathway from one of glucose storage to one of glucose utilization, said diet including a protein component and a carbohydrate component and at least one glucagon pathway-enhancing component, said at least one glucagon pathway-enhancing component comprising an oil containing fatty acids, said oil being administered in an amount of at least 20 ml per day and at given time intervals prior to the fall of blood sugar levels such that relatively stable levels of insulin in the bloodstream are maintained.

2. The system of claim 1 further including an iodine component.

3. The system of claim 1 further including vitamins.

4. The system of claim 1 further including a mineral.

5. The system of claim 1 wherein said fatty acid component is an oil.

6. The system of claim 1 wherein the amount of saturated fat in the bloodstream of a dieter using said dietary system is reduced in response to the administration of said fatty acids.

7. The system of claim 1 wherein said administration of said components according to said given time intervals is further directed to the suppression of appetite.

8. The dietary system according to claim 1 further including iodine in daily supplements of between 1.0 mg and 5.0 mg.

9. The dietary system of claim 1 wherein said fatty acid component is provided as an oil high in fatty acids in daily amounts of between 20.0 ml and 80.0 ml.

10. A dietary system for the stimulation of lipolysis that shifts the dieter's metabolism from fat storage to fat utilization including the intake of fatty acids, said dietary system including a carbohydrate component and further including the intake of at least 20 ml per day of an oil containing monounsaturates and essential fatty acids.

11. The system of claim 10 further including the intake of iodine.

12. The system of claim 10 wherein said fatty acids are administered at given time intervals such that the dieter's appetite is suppressed.

13. A dietary system for the stimulation of lipolysis that comprises a protein component and a carbohydrate component and daily amounts in excess of 20 ml of oils containing monounsaturates and essential fatty acids as necessary to enhance the glucagon pathway of a dieter using said dietary system such that body metabolism is shifted from predominantly fat storage to predominantly fat utilization and relatively stable levels of insulin in the dieter's bloodstream are maintained.

14. The system of claim 13 further including amounts of iodine.

15. The system of claim 13 further including selected vitamins.

16. The system of claim 13 further including selected minerals.

17. The dietary system of claim 1 in which said fatty acid is derived from the group of oils consisting of canola oil, olive oil, primrose oil, black currant oil, and borage oil.

18. The dietary system of claim 10 further including a vitamin.

19. The dietary system of claim 10 further including a mineral.

20. The dietary system of claim 10 wherein said fatty acids are provided from an oil source.

21. The dietary system of claim 10 further including iodine in daily supplements of between 1.0 mg and 5.0 mg.

22. The dietary system of claim 10 wherein said fatty acids are provide from an oil source in daily amounts of between 20.0 ml and 80.0 ml.

23. The dietary system of claim 10 in which said fatty acids are derived from the group consisting of canola oil, olive oil, primrose oil, black currant oil, and borage oil.

* * * * *

UNITED STATES PATENT AND TRADEMARK OFFICE
CERTIFICATE OF CORRECTION

PATENT NO. : 5,484,623
DATED : January 16, 1996
INVENTOR(S) : Linsey McLean

It is certified that error appears in the above-indentified patent and that said Letters Patent is hereby corrected as shown below:

Column 1, line 34, missing period after "role".

Column 1, line 36, missing comma after "basis" and after "obesity".

Column 1, line 45, "dies" should be --diets--.

Column 1, line 51, missing comma after "intake".

Column 1, line 55, "an" should be --and--.

Column 1, line 60, missing comma after "activity".

Column 2, line 43, "group" should be --groups-- and "Homo sapiens" should be underlined or italicized.

Column 3, line 37, missing comma after "particular".

Column 3, line 46, missing comma after "Triglycerides".

Column 3, line 48, "en" should be --been--.

Column 3, line 65, missing comma after "pathway".

UNITED STATES PATENT AND TRADEMARK OFFICE
CERTIFICATE OF CORRECTION

PATENT NO. : 5,484,623
DATED : January 16, 1996
INVENTOR(S) : Linsey McLean

It is certified that error appears in the above-indentified patent and that said Letters Patent is hereby corrected as shown below:

Column 3, line 66, missing comma after "Naturally".

Column 4, line 41, missing comma after "first".

Column 6, line 1, "Primula" should be underlined or italicized. Column 6, line 20, missing comma after "peptides".

Column 7, line 23, "tie" should be --the--.

Column 7, line 26, missing comma after "allowed".

Column 7, line 67, missing comma after "bacon".

Column 8, line 26, "hipothyroid" should be --hypothyroid--.

Column 8, line 38, "oil" should be --oils--.

Column 10, line 14, "demonstrable" should be "demonstrate".

Column 10, line 19, "en" should be --an--.

UNITED STATES PATENT AND TRADEMARK OFFICE
CERTIFICATE OF CORRECTION

PATENT NO. : 5,484,623
DATED : January 16, 1996
INVENTOR(S) : Linsey McLean

It is certified that error appears in the above-indentified patent and that said Letters Patent is hereby corrected as shown below:

Column 11, line 17, "snacks" should be --snack--.

Column 11, line 65, missing comma after "described".

Column 13, line 4, Claim 22, "provide" should be --provided--.

Signed and Sealed this

Fourteenth Day of May, 1996

Attest:

BRUCE LEHMAN

Attesting Officer   Commissioner of Patents and Trademarks